United States Patent
Hnaníček et al.

(10) Patent No.: US 10,152,255 B2
(45) Date of Patent: Dec. 11, 2018

(54) ACCELERATED LOADING OF GUEST VIRTUAL MACHINE FROM LIVE SNAPSHOT

(71) Applicant: Avast Software s.r.o., Prague (CZ)

(72) Inventors: Luboš Hnaníček, Prague (CZ); Petr Kurtin, Otrokovice (CZ)

(73) Assignee: AVAST SOFTWARE S.R.O., Prague (CZ)

( * ) Notice: Subject to any disclaimer, the term of this patent is extended or adjusted under 35 U.S.C. 154(b) by 27 days.

(21) Appl. No.: 15/636,108

(22) Filed: Jun. 28, 2017

(65) Prior Publication Data

US 2018/0004442 A1 Jan. 4, 2018

Related U.S. Application Data

(60) Provisional application No. 62/356,406, filed on Jun. 29, 2016.

(51) Int. Cl.
*G06F 3/06* (2006.01)
*G06F 9/455* (2018.01)

(52) U.S. Cl.
CPC ............ *G06F 3/0619* (2013.01); *G06F 3/065* (2013.01); *G06F 3/067* (2013.01); *G06F 9/45558* (2013.01); *G06F 2009/45562* (2013.01); *G06F 2009/45583* (2013.01); *G06F 2201/84* (2013.01)

(58) Field of Classification Search
CPC .... G06F 3/0608; G06F 3/0619; G06F 3/0632; G06F 3/065; G06F 3/0664; G06F 3/067; G06F 3/0671; G06F 9/45558; G06F 9/45562; G06F 9/45583; G06F 12/0284; G06F 2201/151; G06F 2212/657; G06F 2212/84
USPC ..................... 711/6, 162, 165, 166
See application file for complete search history.

(56) References Cited

U.S. PATENT DOCUMENTS

| | | | |
|---|---|---|---|
| 2012/0324236 A1* | 12/2012 | Srivastava | G06F 21/57 713/189 |
| 2015/0261576 A1* | 9/2015 | Gong | G06F 9/5016 711/6 |
| 2017/0242719 A1* | 8/2017 | Tsirkin | G06F 9/45558 |

* cited by examiner

*Primary Examiner* — Gary J Portka
(74) *Attorney, Agent, or Firm* — Husch Blackwell LLP

(57) ABSTRACT

Loading a guest virtual machine from a snapshot includes determining a plurality of executable modules loaded in a guest operating system. Hash values for pages of guest physical memory in the snapshot file are determined. Hash values for pages of the executable modules executing in the guest operating system are determined. Matches to the pages in the guest physical memory and the pages of the executable modules are searched for using the hash values. Context information associated with the matching pages in the guest physical memory and the pages of the executable modules is written to the snapshot. The snapshot is modified to link the guest physical memory to the pages of the executable modules.

18 Claims, 7 Drawing Sheets

ACCELERATED LOADING OF GUEST VIRTUAL MACHINE FROM LIVE SNAPSHOT

CROSS-REFERENCE TO RELATED APPLICATIONS

This Application claims priority to U.S. Provisional Patent Application Ser. No. 62/356,406, filed on Jun. 29, 2016, entitled "Accelerated Loading Guest Virtual Machine from Live Snapshot," which is incorporated herein by reference in its entirety.

FIELD OF INVENTION

The present invention relates generally to computing systems, and more particularly, operating systems' memory management with loading a guest virtual machine from a live snapshot.

BACKGROUND OF INVENTION

Address space layout randomization (ASLR) is a security feature available in Windows Vista™ and later versions of Windows®. ASLR is intended to prevent an attacker from predicting target virtual addresses of important data/functions. This feature overrides the default load addresses of executable modules specified in a Portable Executable (PE) image header, and sets a new random load address for every loaded module. The new load address of each module is valid until the next restart of the operating system. It also randomizes virtual memory allocation requests from applications.

While ASLR can improve security, one disadvantage of ASLR is that, because of the randomization of load addresses, modules that could otherwise be shared by host operating systems and guest operating systems are not able to be shared. This is because the randomization of load addresses causes the modules to start at different virtual addresses. Thus, while the modules may be the same on a disk, after loading, they are at different virtual address and cannot be shared. As a result, memory usage may be increased in systems that implement ASLR.

SUMMARY OF INVENTION

The present invention relates to a processor configured for loading a guest virtual machine from a live snapshot. In order to accelerate loading of the guest virtual machine in an address space layout randomization (ASLR) environment, a snapshot of the guest virtual machine may be optimized for creating a live snapshot of the guest virtual machine. The live snapshot can be applied to a suspended virtual machine via running a resuming process.

In one embodiment of the present invention, a method is provided for optimizing a guest virtual machine (VM) snapshot. The method for optimizing may be comprised of two parts. A first part can include running guest modules in memory and sending them to a host, and a second part may include taking a snapshot of the VM and creating a live guest snapshot file. In the beginning of the first part, information about executable modules running inside of a guest OS of the VM is identified and obtained in a guest OS. Subsequently, the processor may create a digest (e.g., hash, MD5, etc.) of every page of the guest physical memory in the snapshot file and a digest (e.g., hash, MD5, etc.) of every page of the executable module running in the guest OS and compare the hashes for matching the pages of executable modules or memories. The second part may include the storing a context information associated with the matches to the pages in the guest physical memory and the pages of the executable modules to a guest snapshot file, and then modifying the snapshot file to link the guest physical memory to the pages of the executable modules. This method can provide for quick location of the corresponding module and page during guest load time and the live guest OS snapshot can be obtained.

One embodiment of the method of the present invention can include the steps of resuming a suspended guest VM from the optimized snapshot in the ASLR environment. The processor may read context information of the guest OS modules, and map the executable modules containing matching pages from the snapshot into a host process virtual memory. The relocation can be performed using the context information stored in the live guest snapshot.

In another embodiment of the present invention, a method is provided for loading a guest VM snapshot in the ASLR environment. The processor may determine whether the guest OS extracted a plurality of executable modules from the guest OS. Subsequently, information of executable modules running inside a guest OS of a VM may be identified and obtained in a guest OS. The processor can create a memory hash for every page of the guest physical memory in the snapshot file and a module hash of every page of the executable modules running in the guest OS. The processor can search the hashes for matching the pages of executable modules or memories. Once the guest VM preparation steps are executed in the processor, then the step of storing the context information associated with the matches to the pages in guest physical memory and the pages of the executable modules to a guest snapshot file, and the step of modifying the snapshot to link the guest physical memory to the pages of the executable modules ay be undertaken. Subsequently, the processor may read the context information of the guest OS modules, and map the executable modules containing matching pages from the snapshot into the host process virtual memory. The relocation may be performed using the context information stored in the live guest snapshot instead of a portable executable (PE) header section. The processor may check the first hash value of the relocated matching page with the hash value stored in the context information.

Another embodiment of the present invention provides a non-transitory computer readable storage medium having a program configured for loading the guest VM in the ASLR environment. For accelerating the loading of the guest VM, the program is executed by the processor for determining whether the guest OS extracted a plurality of executable module from the guest OS of VM. Subsequently, information of the executable modules running inside a guest OS of a VM is identified and obtained in a guest OS. The program may be executed to create a memory hash for every page of the guest physical memory in the snapshot file and a module hash of every page of the executable modules running in the guest OS, and then search the hashes for matching the pages of executable modules or memories. The program may be configured for storing the context information associated with the guest physical memory and the pages of the executable modules, and then modifying the snapshot to link the guest physical memory to the pages of the executable modules. Subsequently, the program can be enabled to read the context information and perform a mapping of the executable modules with matching pages from the snapshot into the host process virtual memory. The relocation is performed by using the context information stored in the live guest snapshot. The program can continuously check the hashes for matching the pages of the module and memory. Through the method, the module can change or update on the host OS, then the original physical memory page coming from the guest snapshot.

BRIEF DESCRIPTION OF THE DRAWINGS

For a better understanding of the disclosure, reference may be made to the accompanying drawings in which.

DETAILED DESCRIPTION

Figure 1:
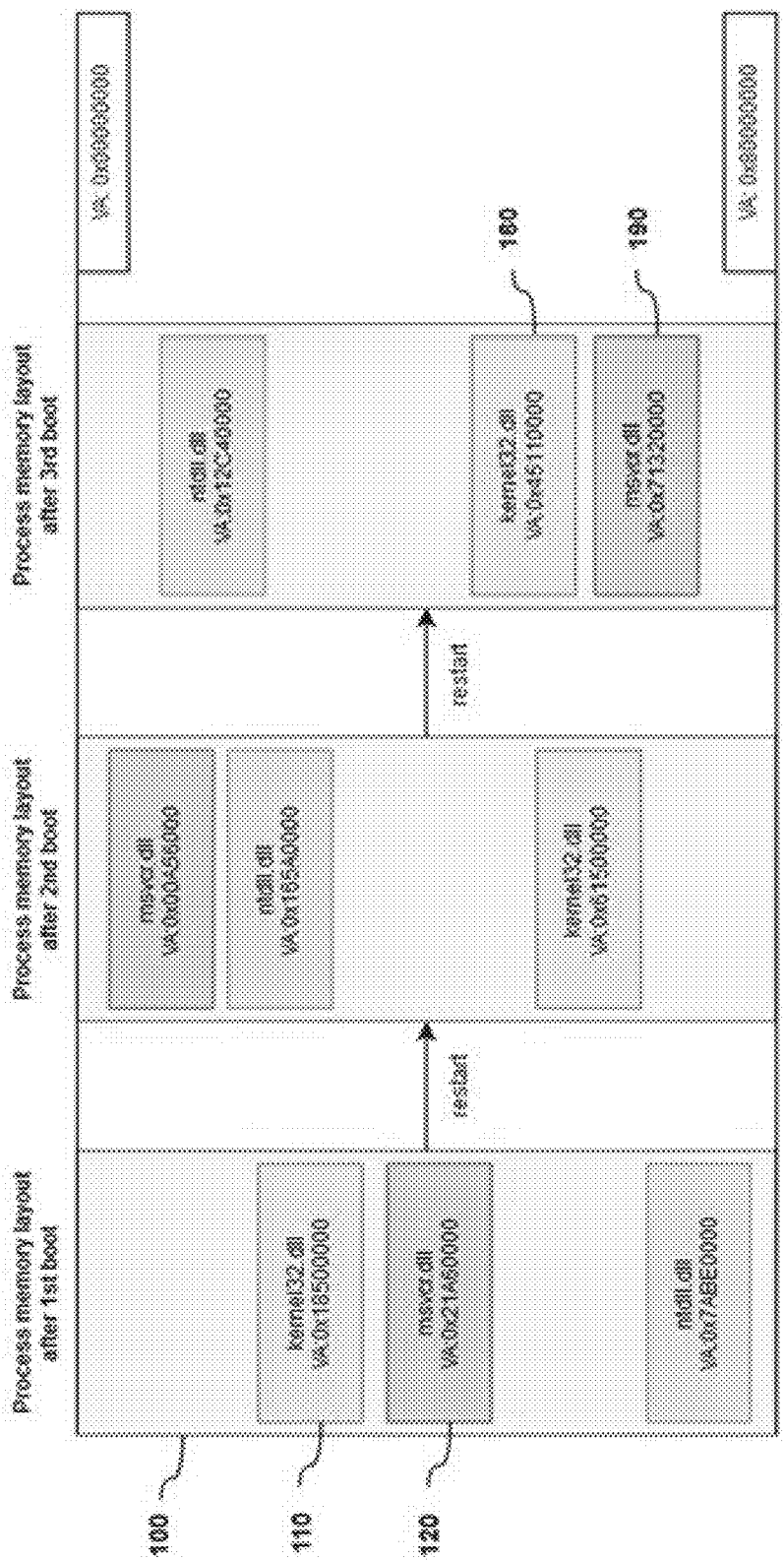
FIG. 1 is a block diagram illustrating example memory layouts in ASLR environments following operating system boots in accordance with one embodiment of the present invention.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

In various aspects of the present invention, a guest snapshot is a saved state of a virtual machine. A live guest snapshot is a saved state of a running virtual machine. The saved state can contain the state of virtual hardware, including the content of virtual machine physical memory. A guest snapshot is typically saved to a file or set of files associated with a virtual machine.

When a virtual machine (VM) uses the same type and version of the host operating system (OS), there is a higher likelihood that modules or files can be found to be shared between the VM and the host OS. Analysis of shared memory blocks is performed on a saved state, or during the creation of this saved state file. The results of the analysis can be used to determine which modules can be shared between a host OS and a VM.

FIG. 1 is a block diagram illustrating example memory layouts in ASLR environments following operating system boots. A process memory layout for a host operating system 100 typically contains tens of various system executable modules 110 and 120 associated with given randomized virtual address every operating system restart. Each restart generates new virtual addresses for these modules 180 and 190. The same technique also applies to every guest operating system running under the control of the host operating system. The relocation of modules across reboots and guest operating systems can have negative consequences, because although modules from both the host and guest operating system are binary same on disk, they are loaded at different virtual addresses and thus cannot be shared across host and guest operating systems.

Some aspects of the present invention utilize the PE module. PE module has a preferred default load address (ImageBase) specified in its image header. This address is referred to as a default load address and it specifies a preferred location in virtual memory of a process where the module should reside after it is loaded. If the module is loaded into its default load address, no relocation is necessary before module execution. Otherwise the module must be relocated to a different virtual address before it can be executed. Those of skill in the art having the benefit of the disclosure will appreciate that other types of executable modules could be used and are within the scope of the inventive subject matter.

When a module is being loaded by an operating system module loader (e.g., Windows NT® module loader), the loader may determine a different load address for the module. For example, a loader may load a module at a different load address from the default load address if another module or process heap is already occupying the module's default load address.

Module relocation is a process of modifying a module's executable code, so that it can be executed from the actual load address when the actual load address is different from the module's default load address. Module relocation is typically performed each time a module is loaded into a non-default load address.

Figure 2:
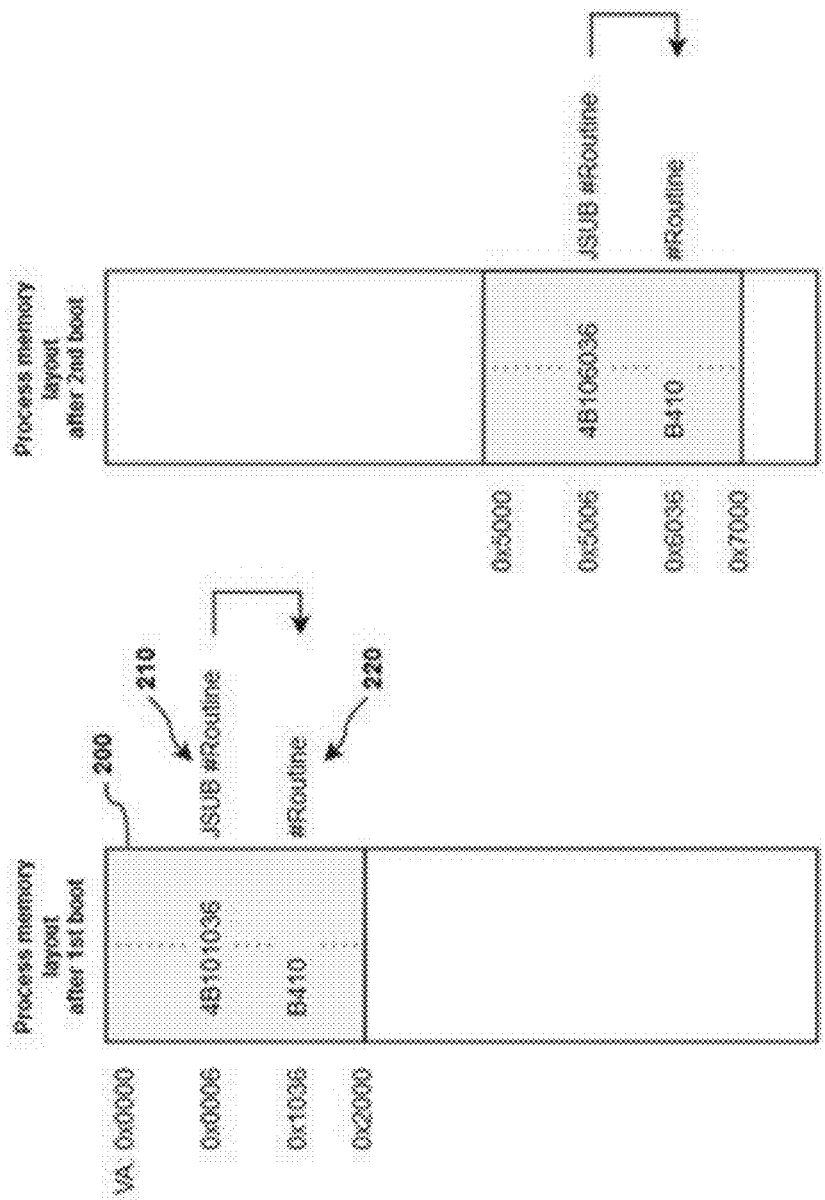
FIG. 2 is a block diagram illustrating a module relocation in ASLR environments in accordance with one embodiment of the present invention.

FIG. 2 is a block diagram illustrating an example module relocation in ASLR environments. In the example illustrated in FIG. 2, a module 200 was linked to an executable file and its preferred default load address was set to 0x0000 by the linker Some code instructions have been already prepared (by the linker) based on the predefined memory address. For example, the "JSUB #Routine" instruction 210, that causes execution to jump to a subroutine called #Routine, can be translated into the following byte sequence: "4B 10 10 36". The first two bytes, "4B 10," identifies the instruction (JSUB) and next two bytes, "10 36," represent the address where execution is to jump (0x1036). However, when the module 200 is relocated to load address that is different from the default load address, these two bytes must be recalculated to reflect the new load address. For example, the byte pattern "4B 10 10 36" is replaced in memory with "4B 10 60 36" if the module is relocated from its default load address to a 0x5000 load address.

Figure 3:
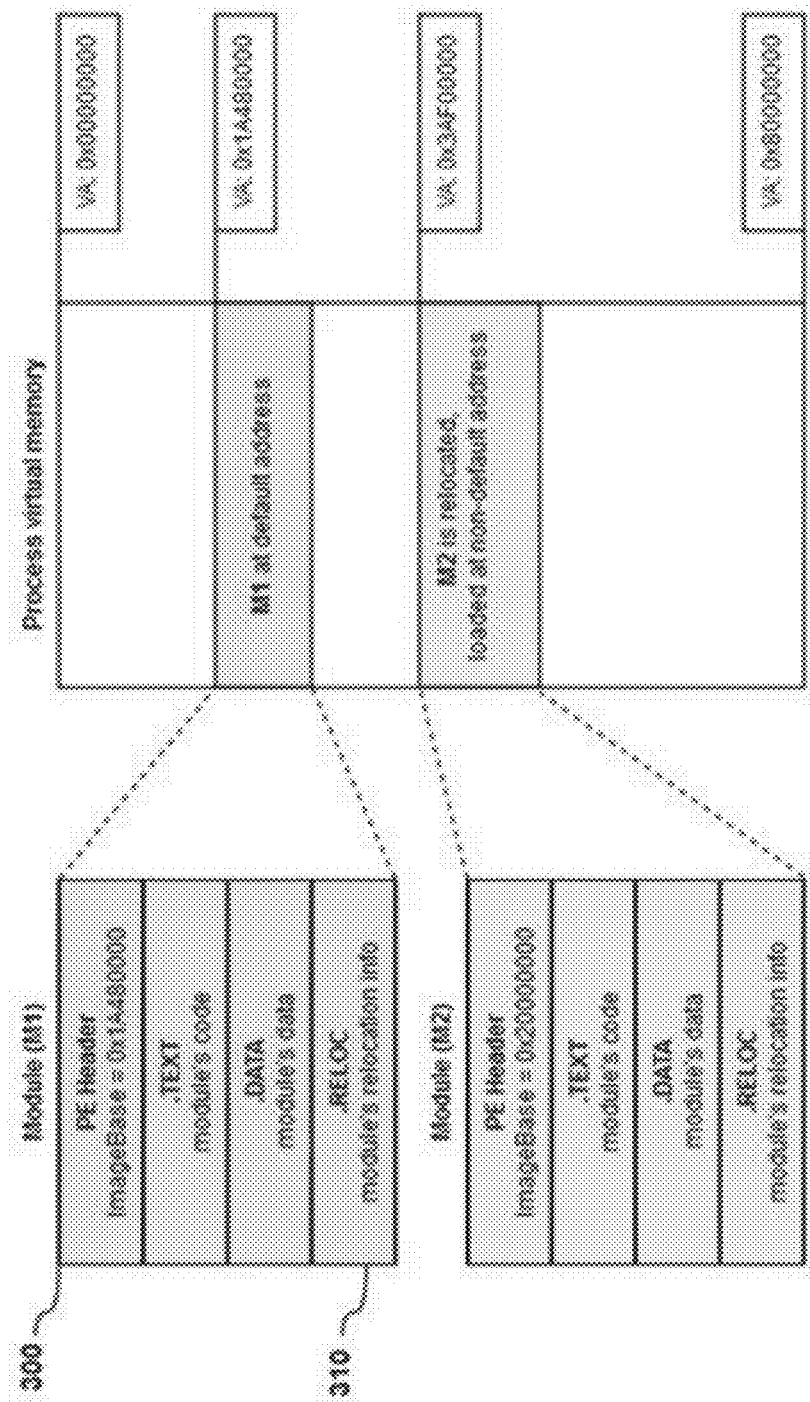
FIG. 3 is a block diagram illustrating a module relocation in ASLR environments using a relocation section in an executable image in accordance with one embodiment of the present invention.

FIG. 3 is a block diagram illustrating a module relocation in ASLR environments using a relocation section in an executable image. As noted above, relocation can slow down module loading time and it can also have a negative memory impact, because relocated executable memory pages are typically duplicated using a copy-on-write (COW) technique. A PE module 300 may have a special section in its image header called ".RELOC" 310 (referred to as a relocation section). The relocation section contains relocation information for all module pages that must be relocated before module execution. Module relocation can be skipped if the module default load address and the module actual load address is the same.

Figure 4:
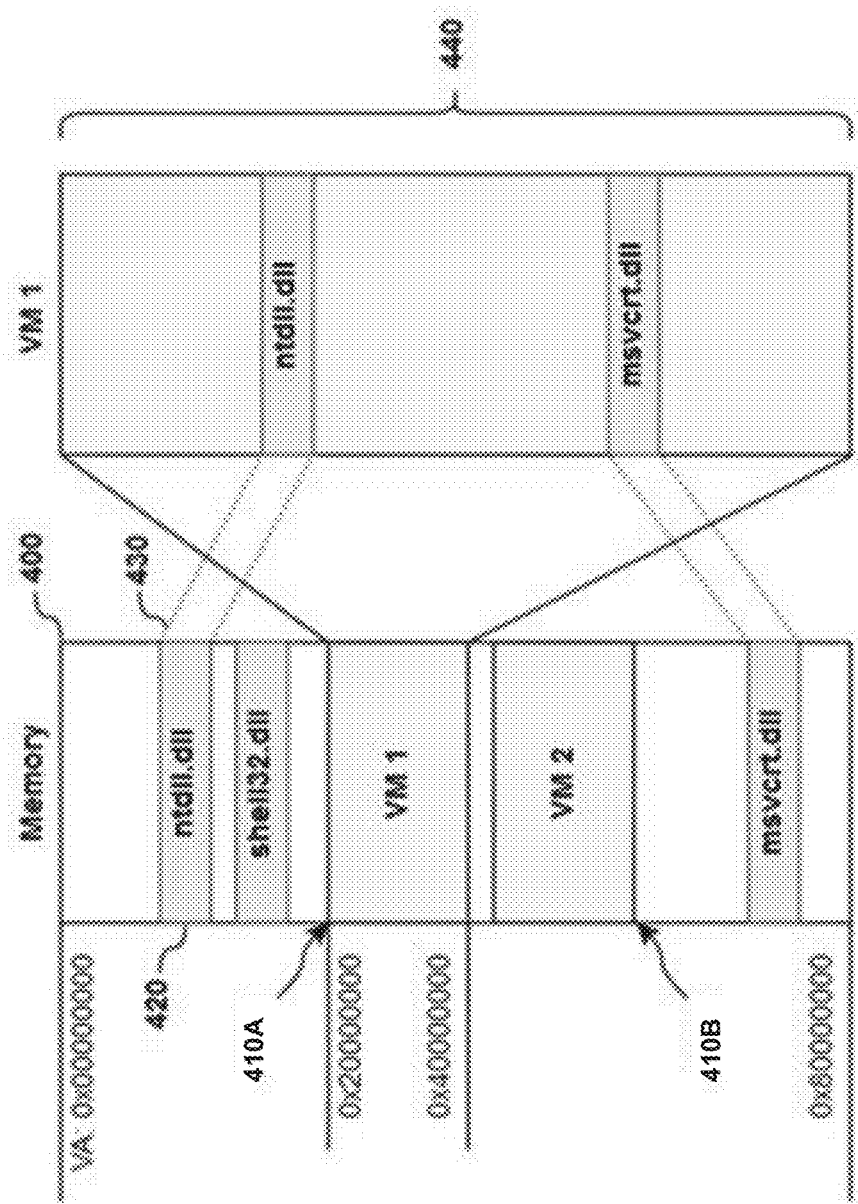
FIG. 4 is a block diagram illustrating virtual machines in an ASLR environment in accordance with one embodiment of the present invention.

FIG. 4 is a block diagram illustrating virtual machines in an ASLR environment. User memory of a physical computer 400 can be used for a main OS (also referred to as a host operating system), running applications and VMs. The number of VMs that can run on a computer system depends on available free memory. In the example illustrated in FIG. 4, two VMs 410A and 410B are executing on the computer. Those of skill in the art having the benefit of the disclosure will appreciate that more or fewer VMs may execute on the computer. When the host OS is the same as the guest OS in VMs 410A and 410B, many system modules are typically binary the same on disk and eligible for use across all OSs. In the example illustrated in FIG. 4, every OS inside has active ASLR and its modules are located at different locations in memory. Each OS restart also loads these modules again at different memory locations. For example, this prevents sharing of the "NTDLL" module 430 in memory between host OS and VMs 410A and 410B. As a consequence it brings larger memory footprint 440 for each running VM.

In some aspects of the present invention, in order to accelerate loading of a guest virtual machine in an ASLR environment, a snapshot of a guest virtual machine is taken and the snapshot is analyzed and optimized to create a live snapshot of the guest virtual machine. The optimized live snapshot of the guest virtual machine can be used to resume a suspended virtual machine.

Figure 5:
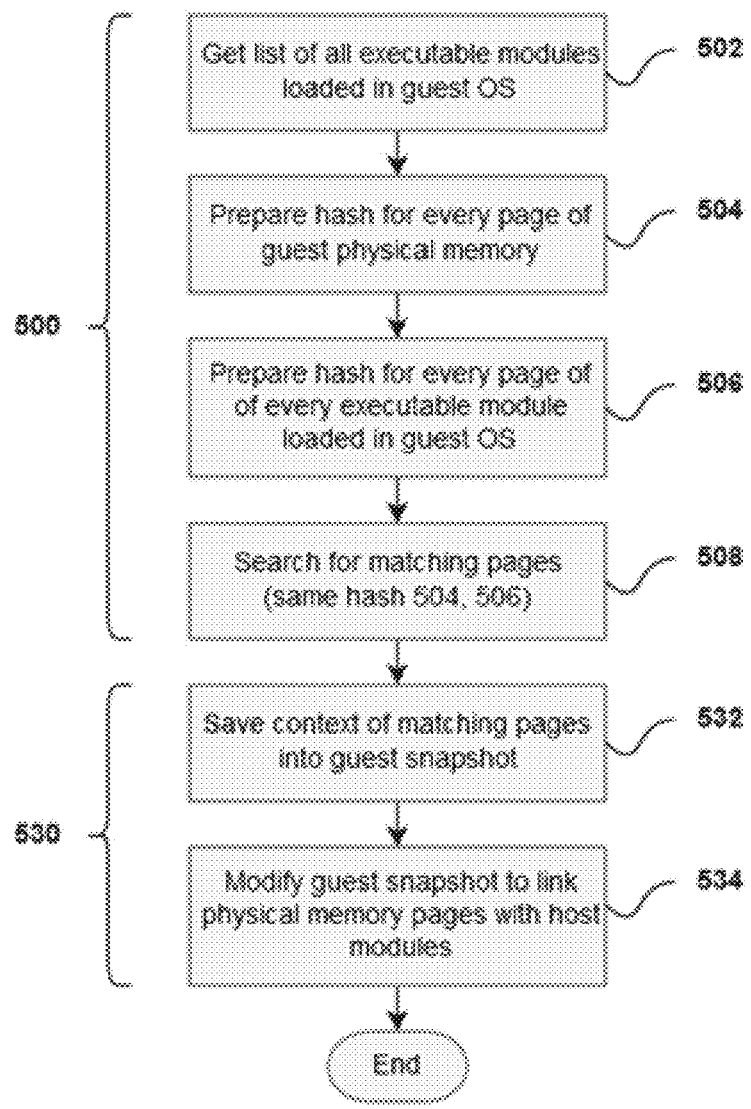
FIG. 5 is a flow chart illustrating a method for optimizing a guest virtual machine snapshot in an ASLR environment in accordance with one embodiment of the present invention.

FIG. 5 is a flow chart illustrating a method for optimizing a guest virtual machine snapshot in an ASLR environment. This phase consists of two parts 500 and 530. In a first part of the method, a VM is prepared for use, information about currently running guest modules in memory can be gathered and sent to a host 500. In a second part of the method, a snapshot of the VM is taken and a live guest snapshot file is created 530.

At block 502, information about executable modules running inside a guest OS of a VM is obtained. In some aspects, all user mode modules loaded in a guest OS can be enumerated by using OS routines. In embodiments that are implemented within the Microsoft Windows family of operating systems, the OS routines CreateToolhelp32Snapshot, Process32First/Process32Next and Module32First/Module32Next APIs can be utilized to enumerate user mode modules. Loaded kernel mode modules can be identified using a NtQuerySystemInformation (SystemModuleInformation) call. The previous two methods for module enumeration may not reveal modules not loaded in any process but still present (i.e., cached) in guest memory (i.e., standby pages), but it is possible to use the undocumented SuperFetch API (Windows Vista™ or later), namely NtQuerySystemInformation (SystemSuperFetchInformation), to query physical memory pages attributes containing required information. Those of skill in the art having the benefit of the disclosure will appreciate that equivalent functionality may be provided in other operating systems, and that use of such equivalent functionality is within the scope of the inventive subject matter.

For every identified executable module, the following information can be extracted from guest OS: a module file system path, which is expected to match the host OS; a module default load address, which is usually different from host OS because of ASLR. The resulting modules information is then passed to host OS for further processing as described below.

At block 504, physical memory regions of a guest OS are located in a snapshot file. A digest (e.g., hash; MD5) can be created of every page of guest physical memory. The page hashes are used later to search for matching module pages.

At block 506, the modules information extracted from guest OS is then used to create a hash of every page of each executable module running in the guest OS. Each module is mapped into host process memory as an executable image using a guest file path (that is expected to be same in host OS). If a module does not exist on a host, it is ignored. The module is then relocated to a guest default load address, but only if the host load address is different (e.g., through ASLR). In some aspects, this module relocation is performed as if the module is loaded at the default address. Conflicts in the use of the default load address are not a concern for purposes of creating the hash, as the module will not be executed. A hash is prepared for every page of a module loaded in the guest OS.

At block 508, pages of guest physical memory are then compared with pages of executable modules from the previous operation (i.e., block 506). In some aspects, only a comparison of hash values is performed for performance reasons. Once a matching page (i.e., matching hash) pair is found, a second level comparison is performed (e.g., a second hash or a simple comparison of page data to avoid possible race conditions).

At block 532, context information about the modules identified at block 502 that contain at least one page identified in guest physical memory is obtained. The information is then saved into the guest snapshot file. In some aspects, the context information includes: assigned module unique identifier (may be just an index); module file path; module default load address from PE header; guest load base address. Also for every relocated page of the module, the following is also saved into the guest snapshot file: assigned page module local unique identifier (a index can be used); the relative virtual address (RVA) of the page; physical address of the guest matching physical memory page; relocation information for this page; and a hash of the page. The RVA is the offset of the module page from the beginning of module (when mapped into memory).

The resulting context information is serialized into the guest snapshot file for later use during guest OS load time. Data structures or object state is translated into a format that can be stored into a file.

At block 534, the guest physical memory attributes are modified to contain links to modules pages. For each matching physical page, the following information can be persisted into page attributes: a special "page is linked to host module" flag is set for the page; a unique module identifier; a module local unique page identifier. In some aspects, this can provide for quick location of the corresponding module and page during guest load time.

At this point, a live guest OS snapshot has been created.

Figure 6:
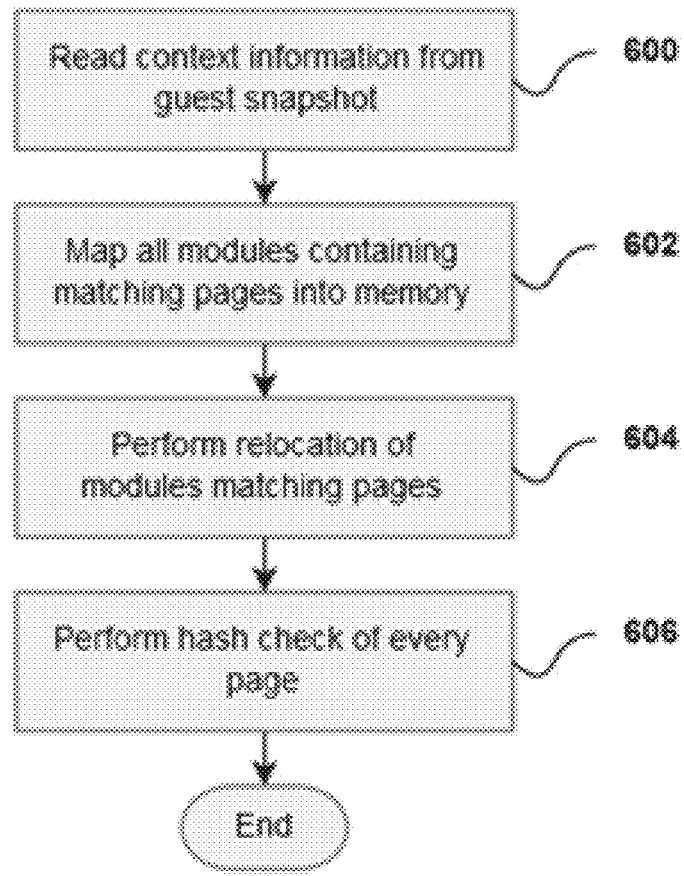
FIG. 6 is a flow chart illustrating a method for resuming a suspended guest virtual machine from an optimized snapshot in an ASLR environment in accordance with one embodiment of the present invention.

FIG. 6 is a flow chart illustrating a method for resuming a suspended guest virtual machine from an optimized snapshot in an ASLR environment.

At block 600, context information of guest OS modules, prepared in the suspending process described above with respect to FIG. 5, is read.

At block 602, each identified executable module must be mapped into the host process virtual memory as an executable image. This operation is typically very fast as the host OS is already using the executable module.

Blocks 604 and 606 are executed to preprocess every page of the identified modules.

At block 604, page relocation of pages of the module is performed to match the guest load address. The relocation is performed using the context information stored in the live guest snapshot is used instead of information in the ".RELOC" image header section. This is because the ".RELOC" information is likely paged out on the host OS and accessing it would result in extra disk I/O.

At block 606, the page is hashed and the resulting hash value is compared with the hash value from context information to ensure it is still the very same page. For example, it is possible that the module can be already changed/updated on host OS. In this case the original physical memory page coming from guest snapshot is used instead.

For each guest physical memory page with "page is linked to host module" flag set, use unique module/page identifier saved in physical page attributes process the module page prepared as described above with respect to blocks 602-606 of the method.

In some embodiments, once the guest memory load is finished, all mapped executable modules are released to minimize virtual address space consumption. This can be especially desirable for 32-bit systems with limited virtual address space.

Figure 7:
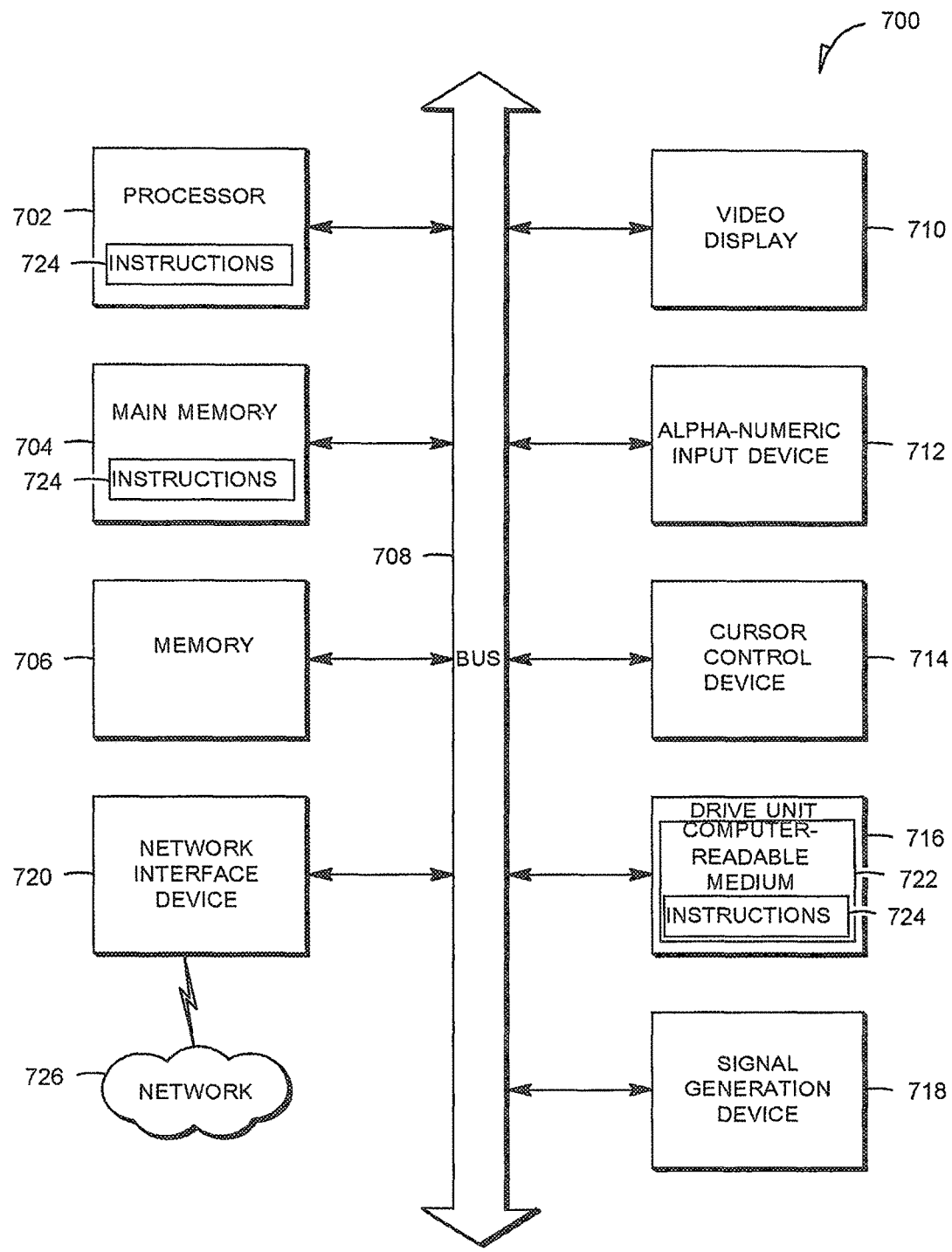
FIG. 7 is a block diagram of an example embodiment of a computer system upon which embodiments of the inventive subject matter can execute in accordance with one embodiment of the present invention.

FIG. 7 is a block diagram of an example embodiment of a computer system 700 upon which embodiments of the inventive subject matter can execute. The description of FIG. 7 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As indicated above, the system as disclosed herein can be spread across many physical hosts. Therefore, many systems and sub-systems of FIG. 7 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, smart phones, network PCs, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

The above described systems and methods of sharing memory of executable modules between guest operating system and host operating system with active (ASLR) can result in significant improvement in the functioning of a computing system. Whenever a guest operating system and a host operating system share a same or similar executable module set, the above described systems and methods can save large numbers of memory blocks. Further, in some aspects, disk I/O needed during starting of a guest operating system from a live snapshots and their size on disk can be reduced.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a disk drive unit 716, a signal generation device 718 (e.g., a speaker), and a network interface device 720.

The disk drive unit 716 includes a machine-readable medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, the main memory 704 and the processor 702 also constituting machine-readable media.

While the machine-readable medium 722 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a signal transmission medium via the network interface device 720 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for optimizing a guest virtual machine (VM) snapshot, the method comprising the steps of:
    loading a plurality of executable modules in a guest operating system (OS);
    extracting information of the executable modules in the guest OS;
    creating a memory hash for pages of guest physical memory of the guest OS;
    creating a module hash for pages of the executable modules executing in the guest OS;
    searching for matches to the pages of guest physical memory and the pages of the executable modules;
    storing context information associated with the matches to the pages of guest physical memory and the pages of the executable modules to a snapshot; and
    modifying the snapshot to link the guest physical memory to the pages of the executable modules.

2. The method of claim 1, further comprising the step of determining at least one of a module file system path and a module default load address for each of the plurality of executable modules.

3. The method of claim 1, wherein the memory hash for the pages of guest physical memory is located in the snapshot.

4. The method of claim 1, wherein the step of creating the module hash for the pages of the executable modules executing in the guest OS includes relocating an executable module as if the module is loaded at a default address associated with the module prior to determining the module hash.

5. The method of claim 1, wherein the step of searching for matches to the pages of guest physical memory and the pages of the executable modules includes searching for matches of the memory hash to the module hash.

6. The method of claim 1, wherein the context information includes at least one of an assigned module unique identifier, a module file path, a module default load address from a portable executable (PE) header, a guest load base address, a relative virtual address (RVA) of at least one of the pages of the executable modules, a physical address of at least one of the pages of the guest physical memory, relocation information, the memory hash, and the module hash.

7. The method of claim 1, wherein the step of modifying the snapshot to link the guest physical memory to the pages of the executable modules includes storing attributes of the guest physical memory for providing a quick location function.

8. The method of claim 1, further comprising the steps of:
    reading the context information from the snapshot;
    mapping modules containing matching pages from the snapshot into a host process virtual memory; and relocating the matching pages for the modules to match a guest load address, the relocating using the context information.

9. The method of claim 8, further comprising the step of checking a first hash of the relocated matching page with a hash stored in the context information.

10. A method for loading a guest virtual machine (VM) snapshot, the method comprising the steps of:
    determining to extract a plurality of executable modules in a guest operating system (OS);
    extracting information of the executable modules in the guest OS;
    creating a memory hash value for pages of guest physical memory;
    creating a module hash value for pages of the executable modules executing in the guest OS;
    searching for matches to the pages of the guest physical memory and the pages of the executable modules;
    storing context information associated with the matches to the pages of the guest physical memory and the pages of the executable modules to a guest snapshot file;
    modifying the snapshot file to link the guest physical memory to the pages of the executable modules;
    reading the context information from the snapshot file;
    mapping modules containing matching pages from the snapshot file into a host process virtual;
    relocating the matching pages for the modules to match a guest load address, the relocating using the context information; and
    checking a first hash value of the relocated matching page with a hash value stored in the context information.

11. The method of claim 10, further comprising the step of determining at least one of a module file system path and a module default load address for each of the plurality of executable modules.

12. The method of claim 10, wherein the memory hash value for the pages of the guest physical memory is located in the snapshot file.

13. The method of claim 10, wherein the step of creating the module hash value for the pages of the executable modules executing in the guest OS includes relocating an executable module as if the module is loaded at the default address associated with the module prior to determining the module hash value.

14. The method of claim 10, wherein the step of searching for matches to the pages of guest physical memory and the pages of the executable modules includes searching for matches of the memory hash value to the module hash value.

15. The method of claim 10, wherein the context information includes at least one of an assigned module unique identifier, a module file path, a module default load address from a portable executable (PE) header, a guest load base address, a relative virtual address (RVA) of at least one of the pages of the executable modules, a physical address of at least one of the pages of the guest physical memory, relocation information, the memory hash value, and the module hash value.

16. The method of claim 10, wherein the step of modifying the snapshot file to link the guest physical memory to the pages of the executable modules includes storing attributes of the guest physical memory for providing a quick location function.

17. A non-transitory computer readable storage medium having a program stored thereon, the program causing a computer to execute the steps of:
    determining to extract a plurality of executable modules in a guest operating system (OS);
    extracting information of the executable modules in the guest OS;
    creating a memory hash value for pages of guest physical memory;
    creating a module hash value for pages of the executable modules executing in the guest OS;
    searching for matches to the pages of the guest physical memory and the pages of the executable modules;
    storing context information associated with the matches to the pages of the guest physical memory and the pages of the executable modules to a guest snapshot file;
    modifying the snapshot file to link the guest physical memory to the pages of the executable modules;
    reading the context information from the snapshot file;
    mapping modules containing matching pages from the snapshot file into a host process virtual;
    relocating the matching pages for the modules to match a guest load address, the relocating using the context information; and
    checking a first hash value of the relocated matching page with a hash value stored in the context information.

18. The non-transitory computer readable storage medium of claim 17, wherein the instructions further comprise instruction for:
    determining at least one of a module file system path and a module default load address for each of the plurality of executable modules.

* * * * *